(12) United States Patent
Iyer et al.

(10) Patent No.: US 11,157,191 B2
(45) Date of Patent: *Oct. 26, 2021

(54) INTRA-DEVICE NOTATIONAL DATA MOVEMENT SYSTEM

(71) Applicant: Dell Products L.P., Round Rock, TX (US)

(72) Inventors: Shyamkumar T. Iyer, Austin, TX (US); William Price Dawkins, Lakeway, TX (US); Kurtis John Bowman, Austin, TX (US); Jimmy Doyle Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/396,433

(22) Filed: Apr. 26, 2019

(65) Prior Publication Data
US 2020/0341673 A1    Oct. 29, 2020

(51) Int. Cl.
| | |
|---|---|
| *G06F 3/00* | (2006.01) |
| *G06F 3/06* | (2006.01) |
| *G06F 9/30* | (2018.01) |
| *G06F 9/455* | (2018.01) |
| *G06F 9/54* | (2006.01) |

(52) U.S. Cl.
CPC .......... *G06F 3/0646* (2013.01); *G06F 3/0604* (2013.01); *G06F 3/067* (2013.01); *G06F 9/3009* (2013.01); *G06F 9/45558* (2013.01); *G06F 9/54* (2013.01); *G06F 2009/45579* (2013.01); *G06F 2009/45583* (2013.01)

(58) Field of Classification Search
CPC ... G06F 9/54; G06F 9/461; G06F 2009/45583
See application file for complete search history.

(56) References Cited

U.S. PATENT DOCUMENTS

| | | | |
|---|---|---|---|
| 5,884,040 A | 3/1999 | Chung | |
| 5,910,987 A * | 6/1999 | Ginter | G06Q 20/102 705/52 |

(Continued)

OTHER PUBLICATIONS

Torsten Hoefler, Message Progression in Parallel Computing—to Thread or not to Thread? (Year: 2008).*

(Continued)

*Primary Examiner* — Lechi Truong
(74) *Attorney, Agent, or Firm* — Joseph Mencher

(57) ABSTRACT

An intra-device notational data movement system has a chassis including processing system(s) that are configured to provide a first thread and a second thread. A data mover subsystem in the chassis is coupled to the processing system(s). In a communication transmitted by the first thread, the data mover subsystem identifies a request to transfer data to the second thread that is stored in a first portion of a memory system that is associated with the first thread in a memory fabric management database. The data mover subsystem then modifies notational reference information in the memory fabric management database to disassociate the first portion of the memory system and the first thread and associate the first portion of the memory system with the second thread, which allows the second thread to reference the data using request/respond operations.

11 Claims, 14 Drawing Sheets

(56) References Cited

U.S. PATENT DOCUMENTS

| | | | |
|---|---|---|---|
| 6,182,152 B1* | 1/2001 | Jonkers | G06F 9/52 |
| | | | 719/310 |
| 6,349,355 B1* | 2/2002 | Draves | G06F 9/4843 |
| | | | 711/6 |
| 7,856,636 B2* | 12/2010 | Bhatia | G06F 9/526 |
| | | | 718/108 |
| 2003/0217075 A1* | 11/2003 | Nakano | G06F 16/22 |
| 2006/0026380 A1* | 2/2006 | Doi | G06F 12/1027 |
| | | | 711/207 |
| 2007/0239905 A1 | 10/2007 | Banerjee | |
| 2010/0241786 A1* | 9/2010 | Singh | G06F 12/08 |
| | | | 711/103 |
| 2011/0153908 A1 | 6/2011 | Schaefer et al. | |
| 2012/0072768 A1* | 3/2012 | Morris | G11C 29/76 |
| | | | 714/6.2 |
| 2013/0290980 A1 | 10/2013 | Kemp | |
| 2015/0286525 A1* | 10/2015 | Singh | G06F 11/1415 |
| | | | 714/768 |
| 2020/0073826 A1* | 3/2020 | Tsirkin | G06F 9/30076 |
| 2020/0348873 A1* | 11/2020 | Dawkins | G06F 3/0659 |

OTHER PUBLICATIONS

Zhaoguo Wang, Using Restricted Transactional Memory to Build a Scalable In-Memory Database. (Year: 2014).*

Arkaprava Basu1, Efficient Virtual Memory for Big Memory Servers. (Year: 2013).*

"Pointer (Computer Programming)—Wikipedia, the Free Encyclopedia," Mar. 31, 2019, 22 Pages, Wikimedia Foundation, Inc., https://en.wikipedia.org/wiki/Pointer_(computer_programming).

PCT International Search Report and Written Opinion dated Jul. 31, 2020, Application No. PCT/US2020/029720, 13 pages.

* cited by examiner

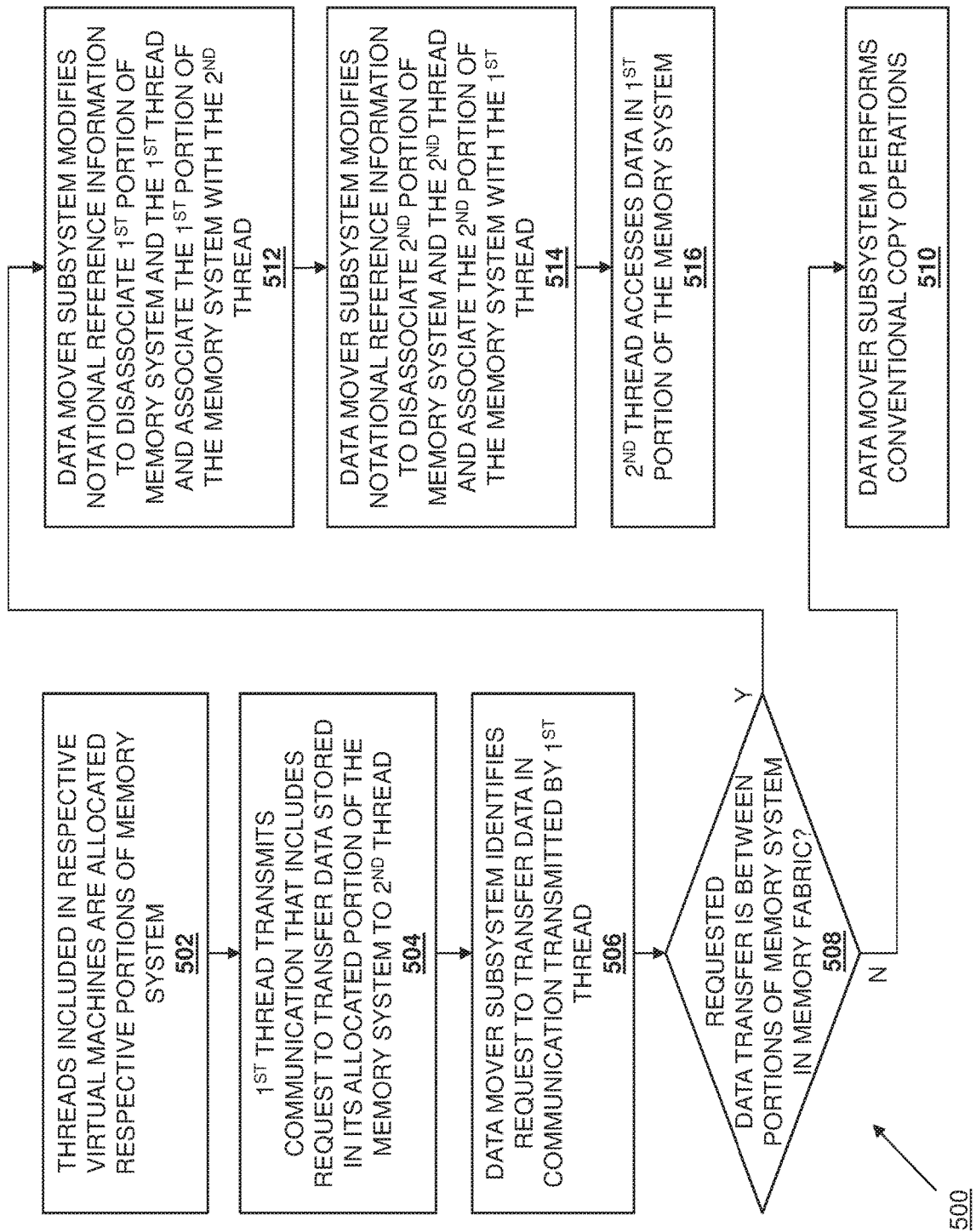

INTRA-DEVICE NOTATIONAL DATA MOVEMENT SYSTEM

BACKGROUND

The present disclosure relates generally to information handling systems, and more particularly to the movement of data within an information handling system via notational reference information modification techniques.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often operate to provide for the movement of data. For example, processor system(s) included in a server device may operate to provide a plurality of virtual machines and/or other applications, and those virtual machines may include threads that transfer data to each other. The transfer of data between threads included on virtual machines provided by a server device is relatively slow, consumes memory bandwidth, and/or introduces other data transfer inefficiencies known in the art.

Furthermore, traditional processing system/memory system combinations built on the paradigm that the processing system/memory system pair is "fast" and the networking system and storage system is "slow" are being rethought as networking system and storage system speeds catch up to the processing system/memory system pair. For example, memory fabrics such as, for example, Gen-Z memory fabrics, have been introduced to eliminate bottlenecks and increase efficiency relative to conventional systems via the unification of communication paths and simplification of software required for processing system/memory system communications. As would be understood by one of skill in the art in possession of the present disclosure, such memory fabrics extend the processing system/memory system byte-addressable load/store model to the entire system by decoupling the processing system/compute functionality from the memory system/media functionality, allowing processing systems and memory systems to act as peers that communicate using the same language and via simplified, high performance, low latency communication paths that do not incur the translation penalties and software overhead associated with conventional systems.

However, the inventors of the present disclosure have found that data transfer between threads included on virtual machines provided by a server device and via such memory fabrics still suffer from inefficiencies. For example, a data transfer from a first thread included on a first virtual machine provided by a server device to a second thread included in a second virtual machine provided by that server device may include the first thread generating and transmitting a memory load instruction to a memory fabric requester associated with the processing system that provides the first virtual machine. In response to receiving that memory load instruction, the memory fabric requester will then transmit a memory fabric request to a memory fabric responder associated with the memory system. The memory fabric responder will then retrieve data that is being requested in the memory fabric request from the memory device(s) in the memory system, and transmit that data as a payload in a memory fabric response to the memory fabric requester. The memory fabric requester will then load the data in the memory fabric response into a local memory system utilized by the processing system that provides the first virtual machine, which allows the first thread to transfer that data (e.g., via a copy engine) to the second thread (e.g., by copying that data into a local memory system utilized by the processing system that provides the second virtual machine.) As such, data movement between threads included on virtual machines provided by the same server device and via a memory fabric requires several read, write, copy, and/or other data transfer operations that the inventors of the present disclosure have discovered are unnecessary.

Accordingly, it would be desirable to provide an improved intra-device data movement system.

SUMMARY

According to one embodiment, an Information Handling System (IHS) includes a processing system; and a memory system that is coupled to the processing system and that includes instructions that, when executed by the processing system, cause the processing system to provide a data mover engine that is configured to: identify, in a communication transmitted by a first thread provided by at least one processing system included in a chassis, a request to transfer data to a second thread that is provided by the at least one processing system included in the chassis, wherein the data is stored in a first portion of a memory system that is associated with the first thread in a memory fabric management database; and modify, in the memory fabric management database, notational reference information in order to disassociate the first portion of the memory system and the first thread and associate the first portion of the memory system with the second thread, wherein the association of the first portion of the memory system with the second thread allows the second thread to reference the data using request/respond operations.

BRIEF DESCRIPTION OF THE DRAWINGS

FIG. 5 is a flow chart illustrating an embodiment of a method for providing intra-device notational data movement.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
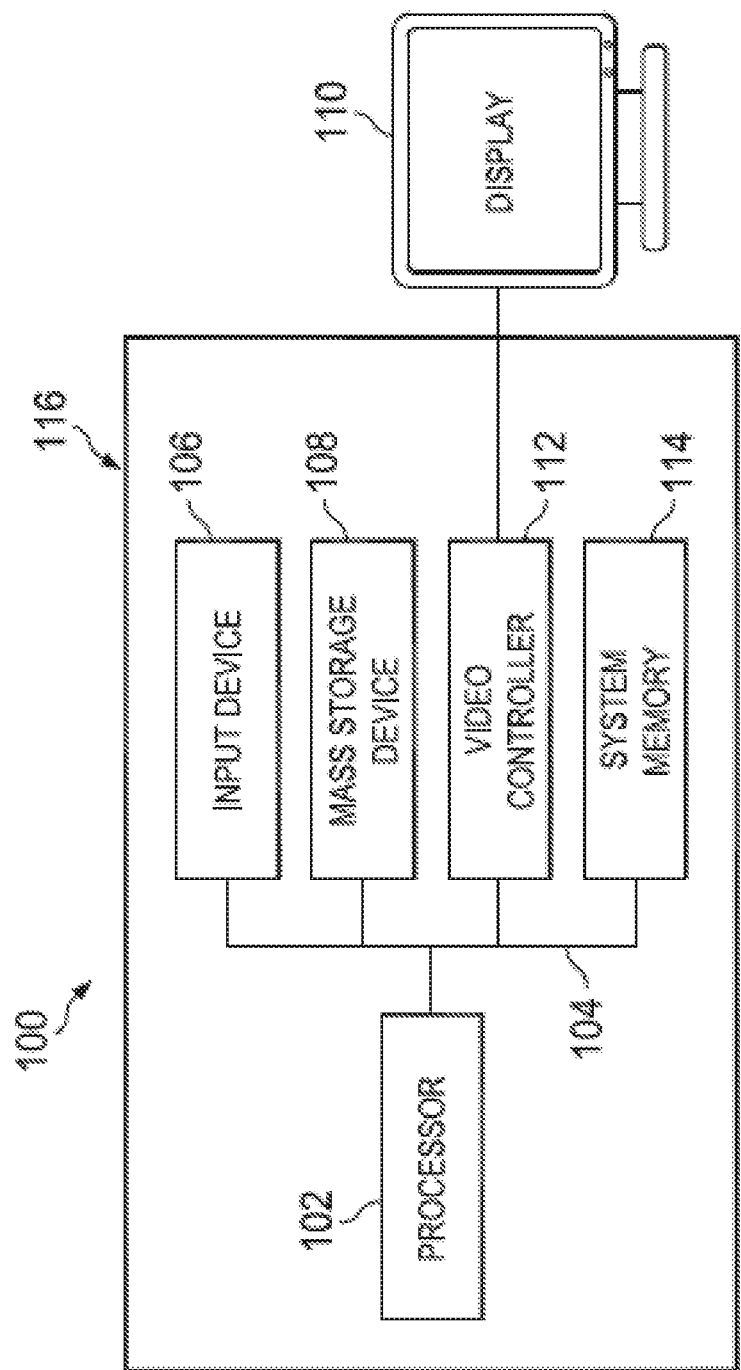
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
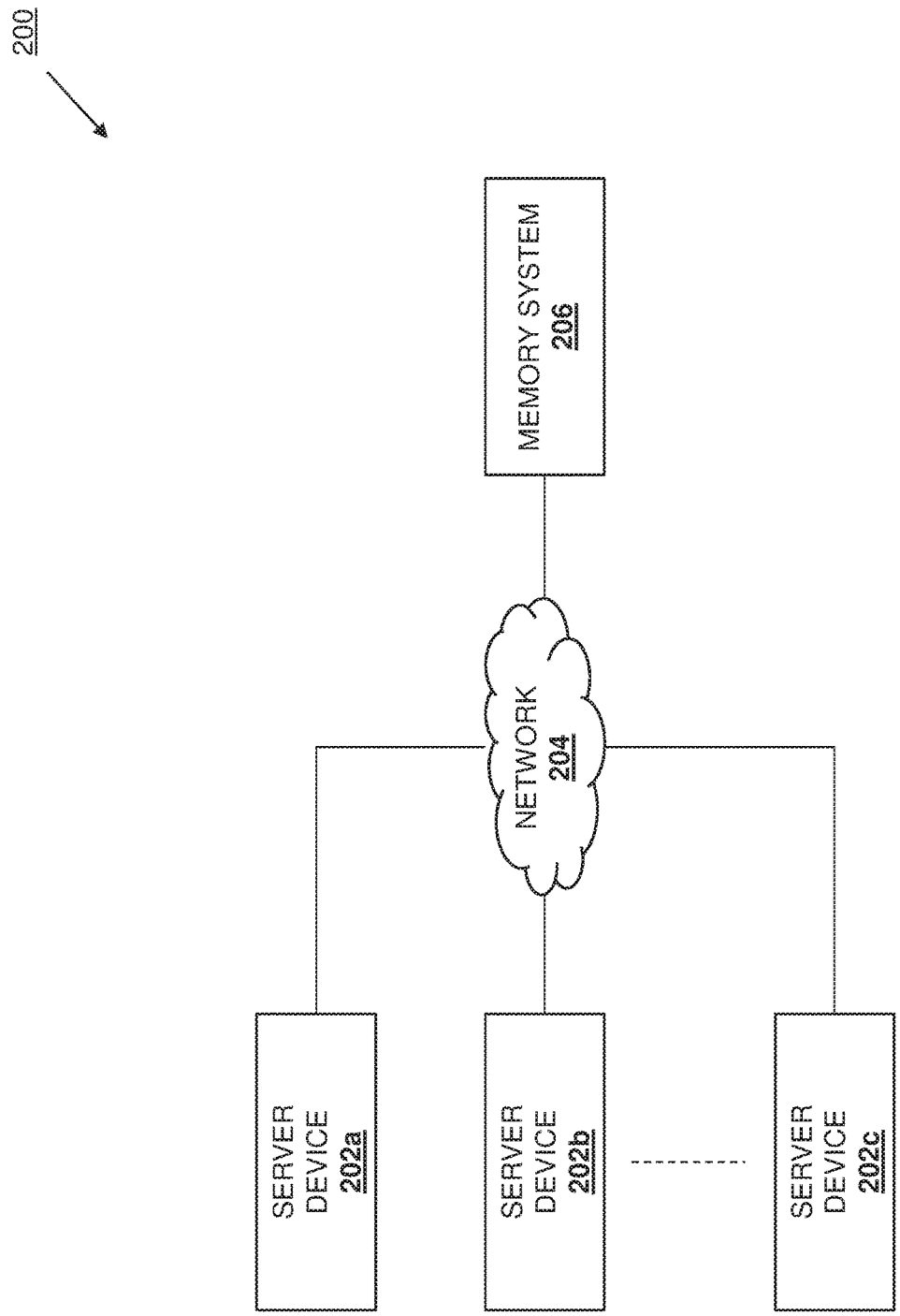
FIG. 2 is a schematic view illustrating an embodiment of a networked system.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-c may be provided by the IHS 100 discussed above with reference to FIG. 1, and/or may include some or all of the components of the IHS 100. However, while illustrated and discussed as server devices, one of skill in the art in possession of the present disclosure will recognize that the server devices 202a-c provided in the networked system 200 may be provided by any devices that may be configured to operate similarly as discussed below. While only three server devices 202a-c are illustrated and discussed below, one of skill in the art in possession of the present disclosure will recognize that many more server devices may (and typically will) be provided in the networked system 200 (e.g., a datacenter) while remaining within the scope of the present disclosure.

In the Illustrated embodiment, the server devices 202a-c are each coupled to a network 204 that is included in the networked system 200 and that may be provided by, for example, a Local Area Network (LAN), the Internet, and/or any other network (or combination of networks) that would be apparent to one of skill in the art in possession of the present disclosure. Furthermore, the illustrated embodiment of the networked system 200 includes a memory system 206 that is coupled to the server devices 202a-c via the network 204. In an embodiment, the memory system 206 may be provided by the IHS 100 discussed above with reference to FIG. 1, and/or may include some or all of the components of the IHS 100. In specific examples, the memory system 206 may be provided by one or more separate server devices, as a logical portion of one or more of the server devices 202, 204, and 206, and/or in a variety of other manners that would be apparent to one of skill in the art in possession of the present disclosure. In the embodiments discussed below, the memory system 206 provides a network-connected memory fabric that may be utilized by any of the server devices 202a-c via the network 204.

For example, the network-connected memory fabric may be a Gen-Z memory fabric created and commercialized by the Gen-Z consortium, and one of skill in the art in possession of the present disclosure will recognize that Gen-Z memory fabrics extend the processing system/memory system byte-addressable load/store model to the entire networked system 200 by decoupling the processing system/compute functionality in the server devices 202a-c from the memory system/media functionality in the memory system 206, allowing processing systems and memory system to act as peers that communicate using the same language and via simplified, high performance, low latency communication paths that do not incur the translation penalties and software overhead associated with conventional systems, thus eliminating bottlenecks and increasing efficiency via the unification of communication paths and simplification of software required for processing system/memory system communications. However, one of skill in the art in possession of the present disclosure will recognize that other types of memory fabrics will fall within the scope of the present disclosure as well. Furthermore, while the server devices 202a-c are illustrated as each coupled to the memory system 206 via the network 204, one of skill in the art in possession of the present disclosure will recognize that in other embodiments the memory system 206 may be provided in a server device while still enabling the functionality described below while remaining within the scope of the present disclosure as well. As such, while a specific networked system 200 has been illustrated and described, one of skill in the art in possession of the present disclosure will recognize that the intra-device notational data movement system of the present disclosure may utilize a variety of other components and component configurations while remaining within the scope of the present disclosure as well.

Figure 3:
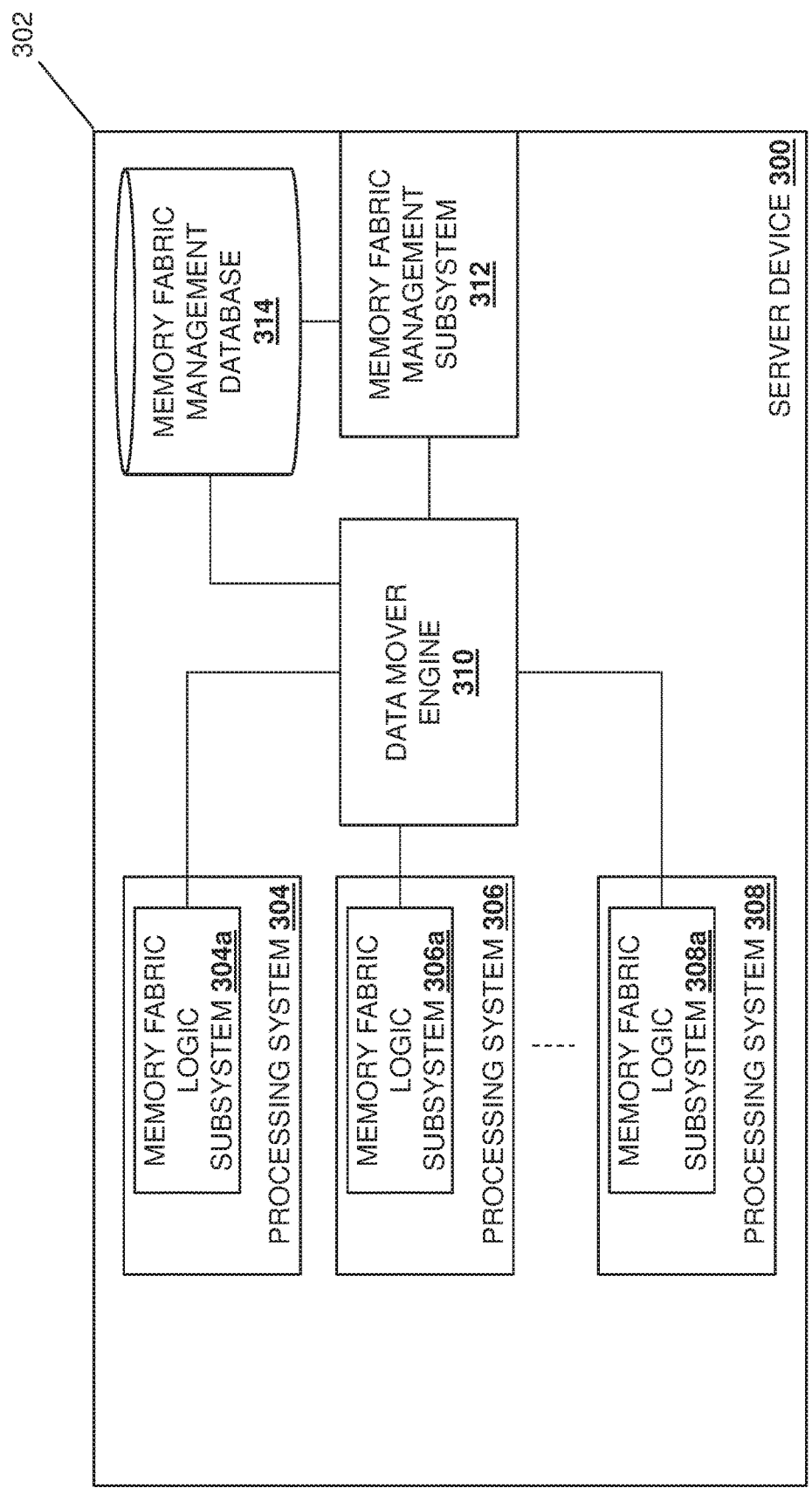
FIG. 3 is a schematic view illustrating an embodiment of a server device that may be included in the networked system of FIG. 2 and that may provide the intra-device notational data movement system of the present disclosure.

Referring now to FIG. 3, an embodiment of a server device 300 is illustrated that may provide any of the server devices 202a-c discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. In the illustrated embodiment, the server device 300 includes a chassis 302 that houses the components of the server device 300, only some of which are discussed below.

For example and as illustrated in FIG. 3, the chassis 302 may house a plurality of processing systems 304, 306, and up to 308, with each of the processing systems 304, 306, and 308 including respective memory fabric logic subsystems 304a, 306a, and 308a. In particular, the processing systems 304, 306, and 308 may be provided by Central Processing Unit (CPU) devices, System-on-Chip (SOC) devices, and/or other processing systems that do not include a media controller device (which, as discussed below, may be provided in the memory fabric memory system utilized by the processing system(s)). As such, the memory fabric logic subsystems 304a, 306a, and 308a included in the processing systems 304, 306, and 308, respectively, may enable at least some of the memory fabric functionality discussed below. In a specific example, the memory fabric is a Gen-Z memory fabric, and the memory fabric logic subsystems operate to provide Gen-Z logic for utilizing the Gen-Z memory fabric, although one of skill in the art in possession of the present disclosure will recognize that other memory fabrics and memory fabric logic subsystems may be utilized with the teachings of the present disclosure while remaining within its scope. While not illustrated, each of the processing system 304, 306, and 308 may be coupled to one or more local memory systems that are provided in the server device 300 and that include instructions that, when executed by the processing systems 304, 306, and 308, allow the processing systems 304, 306, and 308 to perform any of the functionality discussed below (e.g., the provisioning of virtual machines, applications, threads, data mover engine(s), etc.)

In some embodiments, the chassis 302 may house a data mover processing system (not illustrated, but which may include the processor 102 discussed above with reference to FIG. 1) and a data mover memory system (not illustrated, but which may include the memory 114 discussed above with reference to FIG. 1) that is coupled to the data mover processing system and that includes instructions that, when executed by the data mover processing system, cause the data mover processing system to provide a data mover engine 310 that is configured to perform the functionality of the data mover engines and/or server devices discussed below. In the illustrated embodiment, the data mover engine 310 is illustrated as separate from the processing systems 304, 306, and 308 and, as such, may be provided by separate data mover hardware and software (e.g., a Field Programmable Gate Array (FPGA) provided on a Peripheral Component Interconnect express (PCIe) card, and/or other subsystem known in the art) coupled to those processing systems 304, 306, and 308. However, in other embodiments, the data mover engine 310 may be integrated with, included in, and/or otherwise part of any or each of the processing systems 304, 306, and 308. As such, in those embodiments, the data mover engine 310 may be provided by instructions on a local memory system in the server device 300 that is utilized by any or each of the processing systems 304, 306, and 308, provided as an FPGA that is part of any or each of the processing systems 304, 306, and 308, and/or provided in a variety of manners that would be apparent to one of skill in the art in possession of the present disclosure.

In some embodiments, in addition to the intra-device notation data movement operations discussed below, the data mover engine 310 may be configured to perform read, write, copy, and/or other data movement operations for the processing systems 304, 306, and 308 (e.g., to their local memory systems) in order to, for example, relieve the processing systems 304, 306, and 308 from having to use processing cycles to perform those operations. However, one of skill in the art in possession of the present disclosure will recognize that the functionality of the data mover engine 310 discussed below may be provided by itself and/or with other functionality while remaining within the scope of the present disclosure as well. While a few examples of data mover engine implementations and functionality have been described, one of skill in the art in possession of the present disclosure will recognize that the a variety of different functionality for the data mover engine 310 may be enabled in a variety of manners that will fall within the scope of the present disclosure as well.

In the illustrated embodiment, the chassis 302 houses a memory fabric management subsystem 312 that is configured to provide memory fabric management operations for the server device 300. For example, when the memory fabric is a Gen-Z memory fabric as discussed above, the memory fabric management subsystem 312 may include a Gen-Z Memory Management Unit (Gen-Z ZMMU) that, in the example provided below, operates as a Gen-Z ZMMU requester that provides access for the processing systems 304, 306, and 308 to the Gen-Z memory fabric. However, one of skill in the art in possession of the present disclosure will recognize that other memory fabric management subsystems for other memory fabrics may be utilized with the teachings of the present disclosure while remaining within its scope as well.

The chassis 302 may also house a storage system (not illustrated, but which may include the storage 108 discussed above with reference to FIG. 1) that is coupled to the data mover engine 310 (e.g., via a coupling between the storage system and the data mover processing system) as well as to the memory fabric management subsystem 312, and that includes a memory fabric management database 314 that is configured to store any of the information (e.g., the memory fabric reference pointers, memory fabric page ownership information, etc.) utilized by the data mover engine 310 and/or memory fabric management subsystem 312 discussed below. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
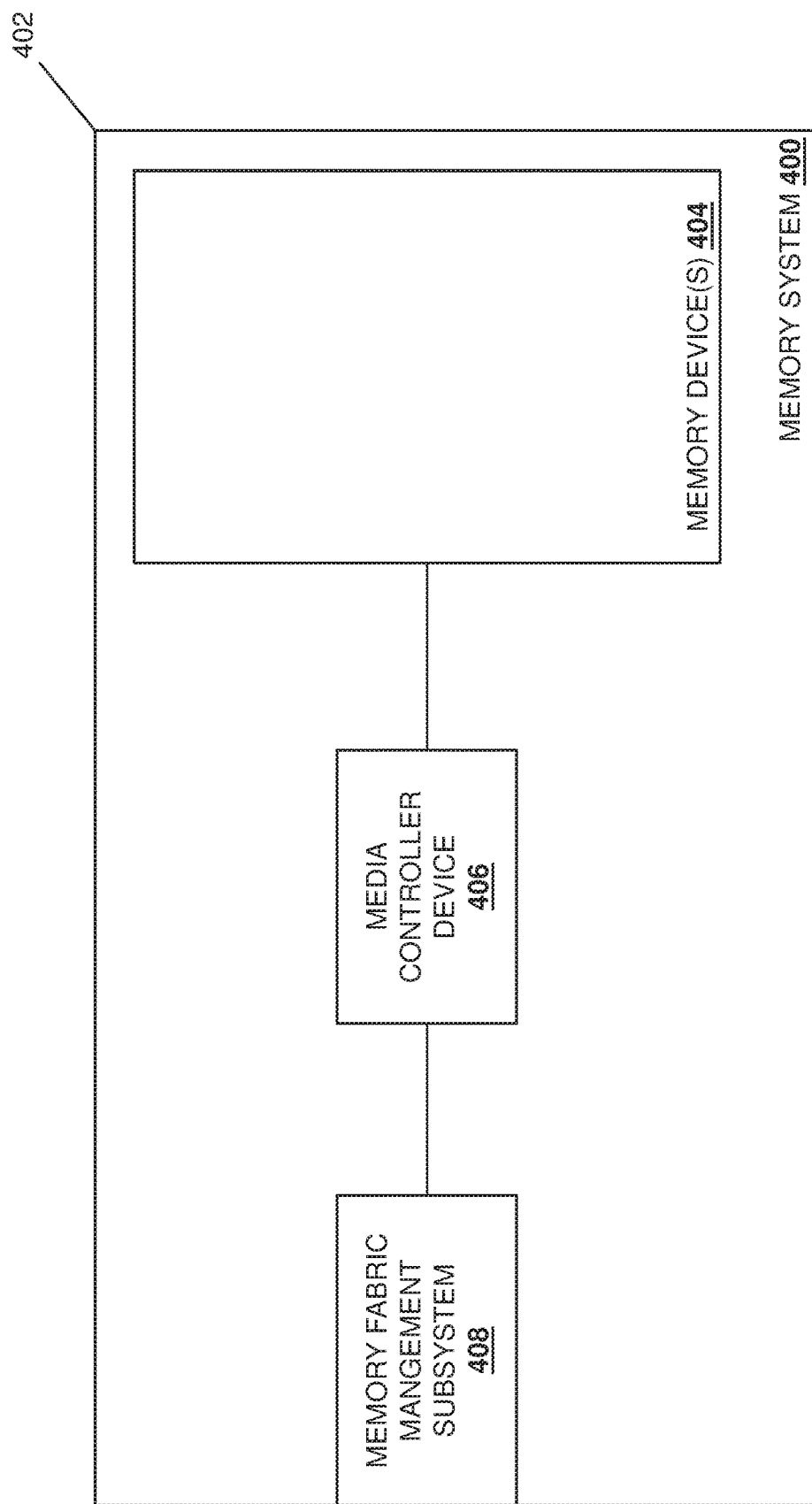
FIG. 4 is a schematic view illustrating an embodiment of a memory system that may be included in the networked system of FIG. 2.

Referring now to FIG. 4, an embodiment of a memory system 400 is illustrated that may provide memory system 206 discussed above with reference to FIG. 2. As such, the memory system may be provided by the IHS 100 discussed above with reference to FIG. 1 and/or may include some or all of the components of the IHS 100, and in specific examples may be provided by one or more separate server devices, one or more of the server devices 202, 204, and 206, and/or in a variety of other manners that would be apparent to one of skill in the art in possession of the present disclosure. Furthermore, while illustrated and discussed as a memory system, one of skill in the art in possession of the present disclosure will recognize that the functionality of the memory system discussed below may be provided by other devices that are configured to operate similarly as discussed below. In the illustrated embodiment, the memory system 400 includes a chassis 402 that houses the components of the memory system 400, only some of which are discussed below.

For example, the chassis 402 may house one or more memory devices 404 that may be provided by Dynamic Random Access Memory (DRAM) devices, Storage Class Memory (SCM) devices, Solid State Drive (SSD) device arrays, and/or any other memory device that would be apparent to one of skill in the art in possession of the present disclosure. In the illustrated embodiment, the chassis 402 houses a media controller device 406 that is coupled to the memory device(s) 404. While illustrated as a single medial controller device 406 coupled to one or more memory device(s) 404, one of skill in the art in possession of the present disclosure will recognize that multiple media controller devices may be provided for the memory device(s) 404 while remaining within the scope of the present disclosure as well. For example, a separate media controller device may be provided for each memory device technology (e.g., a first media controller device may be provided for DRAM devices, a second media controller device may be provided for SCM devices, etc.) However, while a few specific examples of memory devices and media controller devices have been discussed, one of skill in the art in possession of the present disclosure will recognize that a wide variety of memory device and/or media controller device components and/or configurations will fall within the scope of the present disclosure as well.

In the illustrated embodiment, the chassis 402 houses a memory fabric management subsystem 408 that is configured to provide memory fabric management operations for the memory system 400. For example, when the memory fabric is a Gen-Z memory fabric as discussed above, the memory fabric management subsystem 408 may include a Gen-Z Memory Management Unit (Gen-Z ZMMU) that, in the example provided below, operates as a Gen-Z ZMMU responder that operates with Gen-Z ZMMU requester(s) that provide access for the processing systems 304, 306, and 308 to the Gen-Z memory fabric. However, one of skill in the art in possession of the present disclosure will recognize that other memory fabric management subsystems for other memory fabrics may be utilized with the teachings of the present disclosure while remaining within its scope as well. While a specific memory system 400 has been illustrated, one of skill in the art in possession of the present disclosure will recognize that memory systems (or other systems operating according to the teachings of the present disclosure in a manner similar to that described below for the memory system 400) may include a variety of components and/or component configurations for providing conventional memory system functionality, as well as the functionality discussed below, while remaining within the scope of the present disclosure as well.

Referring now to FIG. 5, an embodiment of a method for providing intra-device notational data movement is illustrated. As discussed below, the systems and methods of the present disclosure provide for the "transfer" of data while avoiding the need to perform read, write, copy, and/or other conventional data transfer operations that actually move data between memory fabric address spaces by changing the allocations of portions of a memory system in a memory fabric between a thread that requests to transfer that data and a thread to which the transfer of that data was requested. For example, a first thread included in a first virtual machine provided by a processing system in a server device may request to transfer data to a second thread included in a second virtual machine provided by a processing system in that server device, and a data mover engine (e.g., included in the processing system that provides the first thread, included in hardware/software coupled to the processing system that provides the first thread, etc.) may identify that request to transfer data. In response, the data mover engine modifies notational reference information in a database in order to disassociate the first portion of the memory fabric memory system and the first thread and associate the first portion of the memory fabric memory system with the second thread, which allows the second thread to reference that data in the memory fabric memory system using request/respond operations. As such, more efficient intra-device memory-fabric-based data transfers are provided that eliminate the need to perform conventional data transfer operations that actually move the data between memory fabric address spaces, while providing the effect of such data movement via the modification of notational reference information in order to reallocate portions of the memory fabric.

Figure 6A:
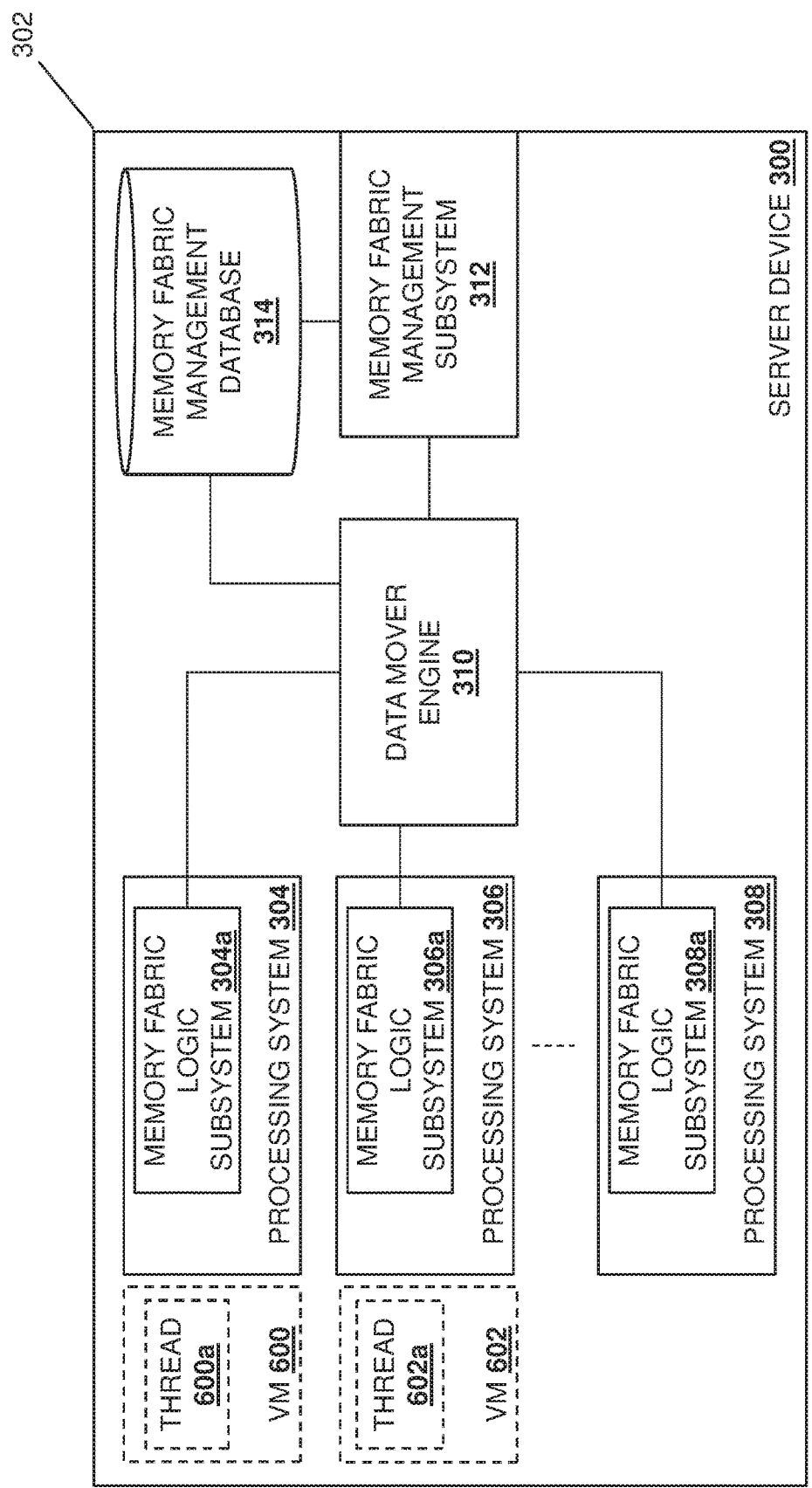
FIG. 6A is a schematic view illustrating an embodiment of the server device of FIG. 3 operating during the method of FIG. 5.

The method 500 begins at block 502 where threads included in respective virtual machines are allocated respective portions of a memory system in a memory fabric. In an embodiment, at block 502, any or all of the processing systems 304, 306, and 308 may operate to provide a virtual machine or other application (e.g., via the execution of instructions on a local memory system to which they are connected), and as would be understood by one of skill in the art in possession of the present disclosure, those virtual machines/applications may include threads or other virtual machine/application components that are configured to utilize portions of a memory fabric memory system similarly as discussed below. With reference to FIG. 6A and for the purposes of the examples provided below, the processing system 304 is illustrated as providing a Virtual Machine (VM) 600 (e.g., via the execution of instructions included on a local memory system) that includes a thread 600a, and the processing system 306 is illustrated as providing a Virtual Machine (VM) 602 (e.g., via the execution of instructions included on a local memory system) that includes a thread 602a. However, while two virtual machines including respective threads are illustrated as being provided by different processing systems, one of skill in the art in possession of the present disclosure will recognize that those virtual machines and their threads may be provided on the same processing system while remaining within the scope of the present disclosure as well.

In an embodiment, at block 502, any or all of the virtual machines, applications, threads, and/or other virtual machine/application components may be allocated portions of a memory system in a memory fabric. For example, the memory fabric management subsystem 312 in the server device 300 may operate to allocate different portions of the memory system 206/400 to the threads 600a and 602a by, for example, communicating with the memory fabric management subsystem 408 in the memory system 206/400 in order to cause the media controller device 406 to provide allocations of memory system address space included in the memory device(s) 404 to the threads 600a and 602a.

In a specific example, Gen-Z ZMMUs may provide Gen-Z apertures for pages in the memory fabric that operate essentially as a page directory for the memory fabric that is managed/programmed by the memory fabric manager and advertised using the Gen-Z apertures, specific memory fabric resources, and memory regions. Furthermore, once mapped and advertised to a server device, the server device may discover the memory as part of its normal boot memory discovery process (e.g., using firmware and via an e820/ACPI table map) and provide its address region in the server devices physical address space map, which allows that memory to be discovered by its operating system. The operating system memory manager will then allocate one or more virtual machine threads from various regions within the system physical address space, including the spaces discovered via the Gen-Z ZMMU apertures.

Furthermore, the memory fabric management subsystem 312 in the server device 300 may store notational reference information about memory system portion allocations in the memory fabric management database 314, which may include, for example, reference pointers that map the first thread to a first portion of the memory system 206/400 and that map the second thread to a second portion of the memory system 206/400, page ownership information that provides the first thread ownership of the first portion of the memory system 206/400 and that provides the second thread ownership of the second portion of the memory system 206/400, and/or any other notational reference information that would be recognized by one of skill in the art in possession of the present disclosure as providing for the allocation of portions of a memory fabric memory system to threads.

Figure 6B:
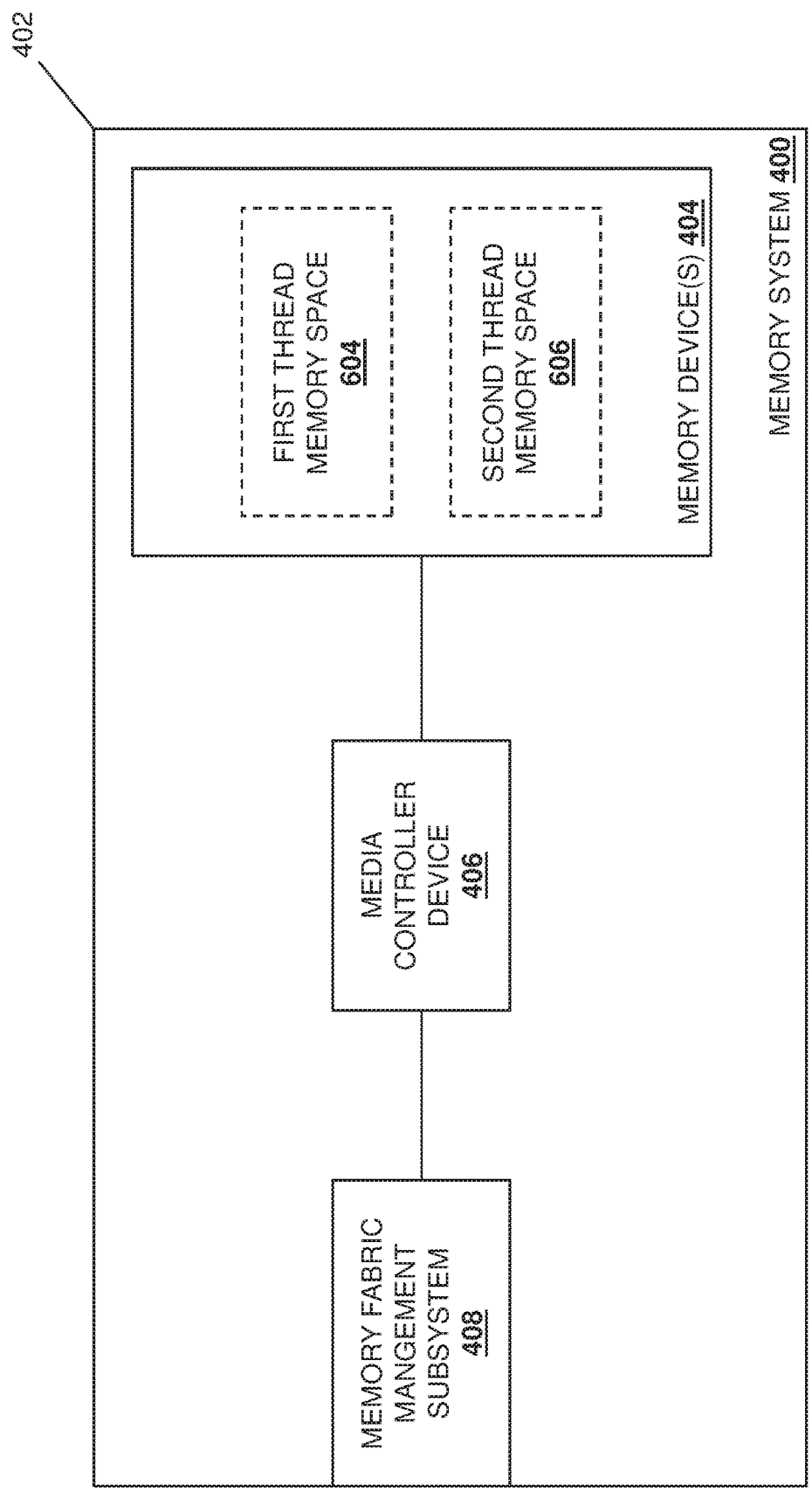
FIG. 6B is a schematic view illustrating an embodiment of the memory system of FIG. 4 operating during the method of FIG. 5.

With reference to FIG. 6B and for the purposes of the examples provided below, the thread 600a is illustrated as having been allocated a first thread memory space 604 (e.g., by the media controller device 406 in response to the communications between the memory fabric management subsystems 312 and 408 as discussed above), and the thread 602a is illustrated as having been allocated a second thread memory space 606 (e.g., by the media controller device 406 in response to the communications between the memory fabric management subsystems 312 and 408 as discussed above). As would be appreciated by one of skill in the art in possession of the present disclosure, the first thread memory space 604 and the second thread memory space 606 may be defined by different memory address ranges provided by the memory device(s) 404, different memory pages provided by the memory device(s) 404, and/or other different portions of the memory device(s) 404 that would be apparent to one of skill in the art in possession of the present disclosure. In the examples below, the first thread memory space 604 and the second thread memory space 606 are equal size memory spaces, but one of skill in the art in possession of the present disclosure will recognize that threads may be allocated different size memory spaces, and the discussion of equal size memory spaces below applies to particular embodiments of the present disclosure. In particular, the portion of the memory system 400 allocated to the thread 602a may be larger than the second thread memory space 606, with the second memory thread space 606 providing a subset of that portion of the memory system 400 allocated to the thread 602a that stores the data being "transferred" during the method 500.

Figure 7:
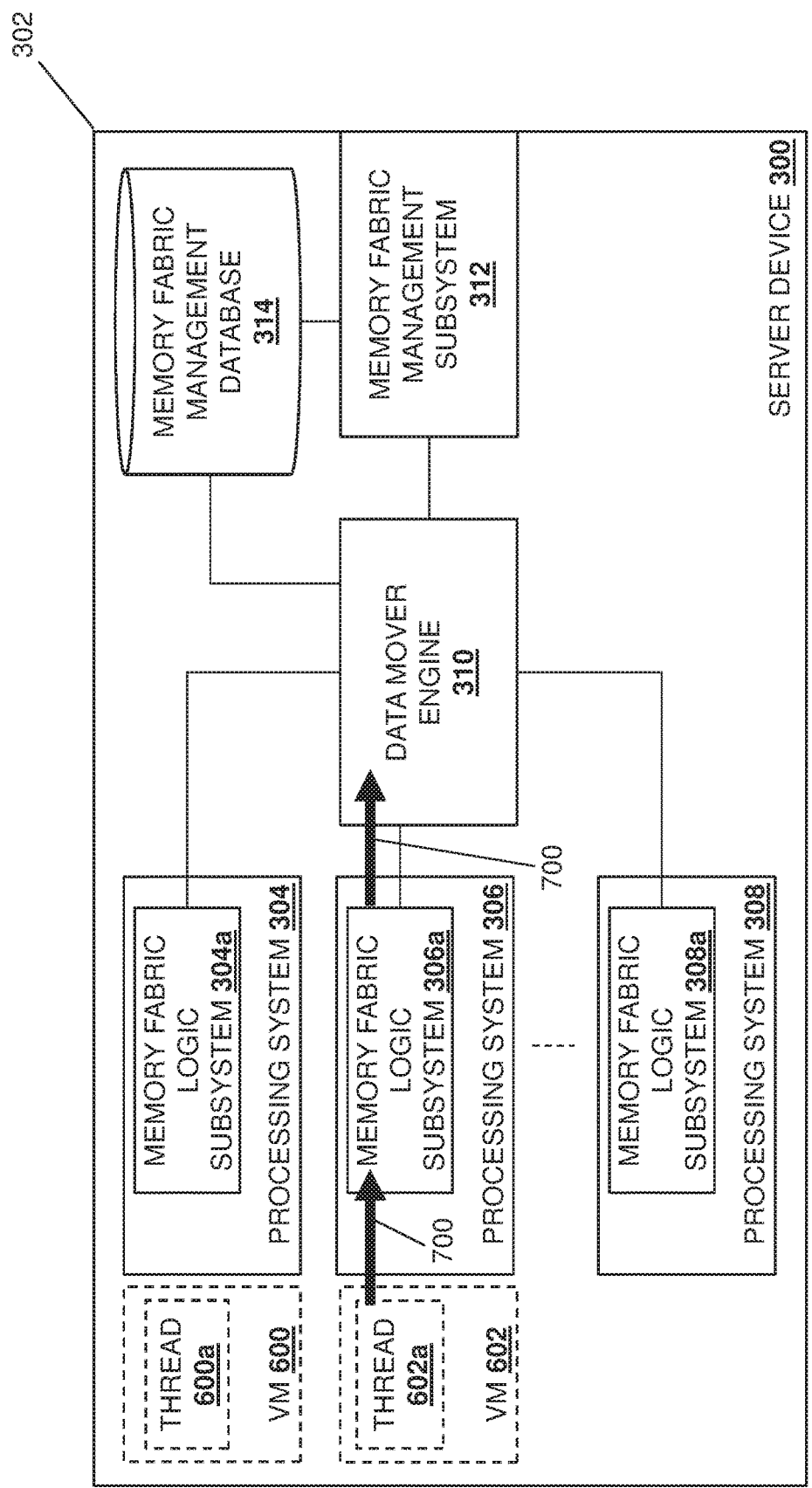
FIG. 7 is a schematic view illustrating an embodiment of the server device of FIG. 3 operating during the method of FIG. 5.

The method 500 then proceeds to block 504 where a first thread transmits a communication that includes a request to transfer data stored in its allocated portion of the memory system to a second thread. In an embodiment, at or before block 504, any thread included in a virtual machine provided by a processing system in the server device 300 may request a data transfer to another thread included in another virtual machine provided by a processing system in the server device 300. One of skill in the art in possession of the present disclosure will recognize that a wide variety of scenarios may call for the transfer of data between threads included in virtual machines provided by processing system(s) in the server device 300, and data transfer requests resulting from any of those scenarios are envisioned as falling within the scope of the present disclosure. Continuing the example above and with reference to FIG. 7, the thread 602a is illustrated as transmitting a request 700 to transfer data via the memory fabric logic subsystem 306a included in the processing system 306, with the data mover engine 310 having access to that request 700. In an embodiment, the request to transfer data provided by the first thread at block 504 may be provided in an Inter-Process Communication (IPC) that includes a reference-only data descriptor transfer message that identifies the second thread and, as would be understood by one of skill in the art in possession of the present disclosure, does not include the data to-be transferred but rather includes references to the location of that data in the memory fabric memory system. For example, the request 700 to transfer data provided by the thread 602a at block 504 may include an IPC that identifies the thread 600a and does not include the data to-be transferred, but rather includes references to the second thread memory space 606 in the memory device(s) 404 that store that data in the memory system 400.

The method 500 then proceeds to block 506 where a data mover subsystem identifies the request to transfer data in the communication transmitted by the first thread. In an embodiment, at block 506, the data mover engine 310 may operate to identify requests to transfer data transmitted by any thread included in any virtual machine provided by any of the processing systems 304, 306, and 308. Continuing with the example provided above and with reference to FIG. 7, the data mover engine 310 may operate to identify the request 700 to transfer data that was transmitted by the thread 602a. In some embodiments, the data mover engine 310 may be configured to snoop communications transmitted by any thread included in any virtual machine provided by any of the processing systems 304, 306, and 308 in order to identify requests to transfer data. For example, the data mover engine 310 may operate to snoop the request 700 to transfer data that was transmitted by the thread 602*a* in order to identify the thread 600*a* to which the data is to-be transferred, data address(es) for the data to-be transferred, data references for the data to-be transferred, and/or any other data transfer information that would be apparent to one of skill in the art in possession of the present disclosure. However, while a specific example of the identification of requests to transfer data have been described, one of skill in the art in possession of the present disclosure will recognize that requests to transfer data may be identified in a variety of manners that will fall within the scope of the present disclosure as well.

The method 500 then proceeds to decision block 508 where it is determined whether the requested data transfer is between portions of the memory system in the memory fabric. In an embodiment, at decision block 508, the data mover engine 310 may operate to determine whether information included in the request to transfer data identified at block 506 provide for the transfer of data between portions of a memory fabric memory system such as, for example, the memory system 206/400. For example, at decision block 508, the data mover engine 310 may use information included in the request to transfer data that was identified at block 506 to determine the current location of the data to-be transferred, as well as the location to which that data will be transferred. In some examples, the request to transfer data may identify the current location of the data to-be transferred and the location to which that data will be transferred. However, in other examples, the current location of the data to-be transferred may be determined by identifying the thread requesting the data transfer, and accessing the memory fabric management database 314 to determine the portion of the memory system 206/400 that is allocated to that thread, while the location to which the data will be transferred may be determined by identifying the thread to which the data will be transferred, and accessing the memory fabric management database 314 to determine the portion of the memory system 206/400 that is allocated to that thread. However, while a few specific examples have been provided, one of skill in the art in possession of the present disclosure will recognize that the determination of whether the requested data transfer is between portions of the memory system in the memory fabric may be performed in a variety of manners that will fall within the scope of the present disclosure as well.

If, at decision block 508, it is determined that the requested data transfer is not between portions of the memory system in the memory fabric, the method 500 proceeds to block 510 where the data mover subsystem performs conventional copy operations. In an embodiment, the data mover engine 310 may determine that the requested data transfer is to and/or from a local memory system (i.e., a local memory system included in the server device 300) and at block 510, the data mover engine 310 may operate to perform conventional copy operations. For example, if at decision block 508 it is determined that the requested data transfer is between local memory systems in the server device 300, at block 510 the data mover engine 310 may read and copy that data from a local memory system in the server device 300 (e.g., that is utilized by the thread 602*a*), and write that data to a local memory system in the server device 300 (e.g., that is utilized by the thread 600*a*). In another example, if at decision block 508 it is determined that the requested data transfer is from a local memory system in the server device 300 to a memory fabric memory system (e.g., the memory system 206/400), at block 510 the data mover engine 310 may read and copy that data from a local memory system in the server device 300 (e.g., that is utilized by the thread 602*a*), and provide that data to the memory fabric management subsystem 312 for writing to the memory system 206/400 (e.g., the first thread memory space 604 that is utilized by the thread 600*a*). In another example, if at decision block 508 it is determined that the requested data transfer is from a memory fabric memory system (e.g., the memory system 206/400) to a local memory system in the server device 300, at block 510 the data mover engine 310 may request and receive that data from the memory fabric management subsystem 312 via the memory system 206/400 (e.g., the second thread memory space 606 that is utilized by the thread 602*a*), and write that data from a local memory system in the server device 300 (e.g., that is utilized by the thread 600*a*). However, while a few examples have been provided, one of skill in the art in possession of the present disclosure will recognize that variety of conventional copy operations may be performed at block 510 while remaining within the scope of the present disclosure as well.

Figure 8:
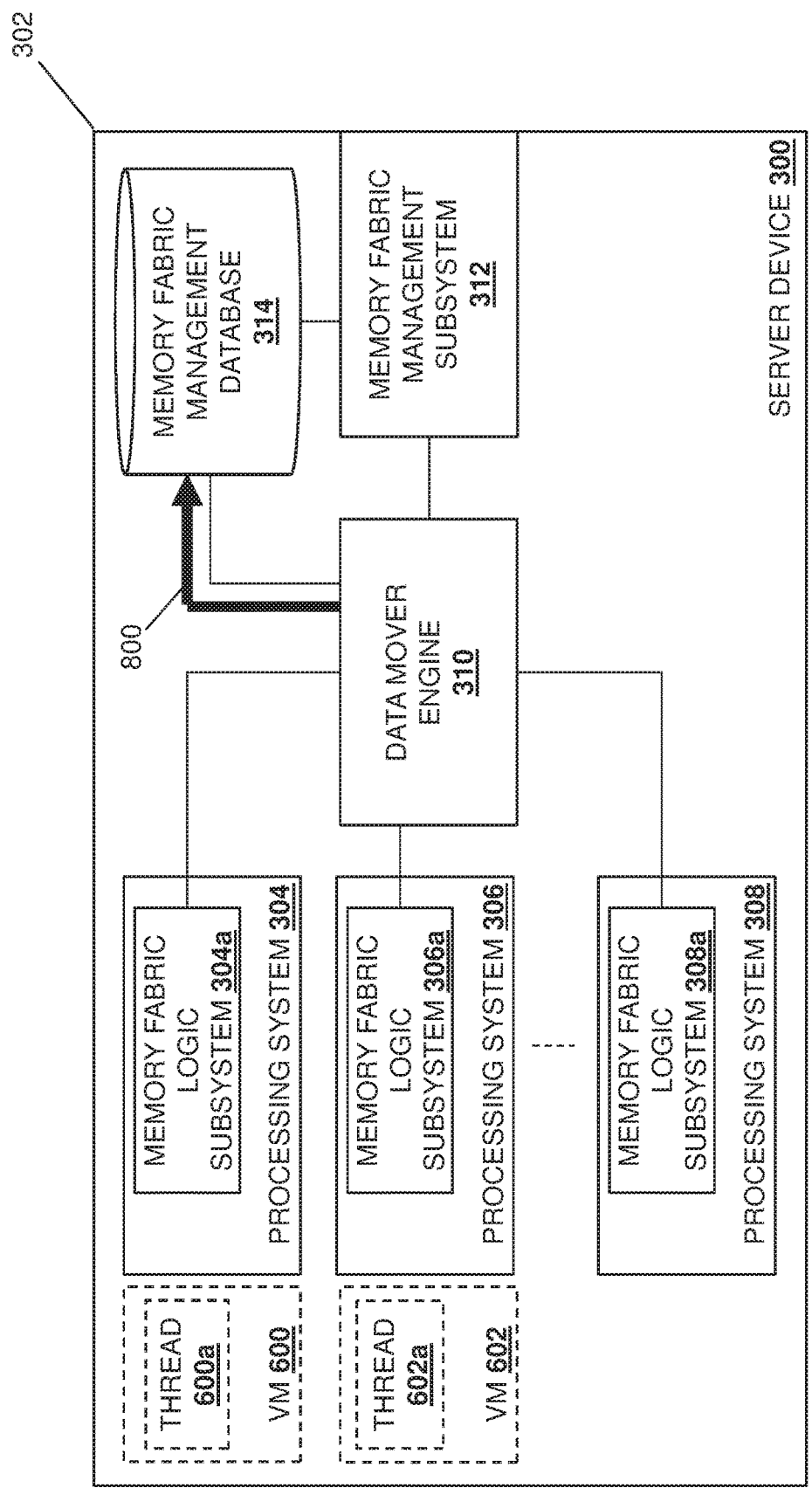
FIG. 8 is a schematic view illustrating an embodiment of the server device of FIG. 3 operating during the method of FIG. 5.

If at decision block 508, it is determined that the requested data transfer is between portions of the memory system in the memory fabric, the method 500 proceeds to block 512 where the data mover subsystem modifies notational reference information to disassociate a first portion of the memory system and the first thread, and associate the first portion of the memory system with the second thread. For example, if at decision block 508 it is determined that the requested data transfer is between the second thread memory space 606 that was allocated to the thread 602*a* and the second thread memory space 606 that was allocated to the thread 602*a*, at block 512 the data mover engine 310 may operate to access the memory fabric management database 314 and perform notational reference information modification operations 800 in the memory fabric management database 314, as illustrated in FIG. 8. In an embodiment, the notational reference information modification operations 800 may be performed on the notational reference information that is associated with the memory system portion allocations and that was stored in the memory fabric management database 314 at block 502 which, as discussed above, may include reference pointers that map the thread 600*a* to the first thread memory space 604 in the memory device(s) 404 included in the memory system 206/400 and that map the thread 602*a* to the second thread memory space 606 in the memory device(s) 404 included in the memory system 206/400, page ownership information that provides the thread 600*a* ownership of the first thread memory space 604 in the memory device(s) 404 included in the memory system 206/400 and that provides the thread 602*a* ownership of the second thread memory space 606 in the memory device(s) 404 included in the memory system 206/400, and/or any other notational reference information that would be recognized by one of skill in the art in possession of the present disclosure as providing for the allocation of portions of the memory fabric memory system to threads.

For example, at block 512, the modification of the notational reference information in the memory fabric management database 314 may include the data mover engine 310 disassociating the thread 602*a* from the second thread memory space 606 that it was allocated in the memory device(s) 404 included in the memory system 206/400 at block 502, and associating the thread 600*a* with the second thread memory space 606 in the memory device(s) 404 included in the memory system 206/400. In a specific example, the disassociation of the thread 602*a* from the second thread memory space 606 and the association of the thread 600a with the second thread memory space 606 may include changing a reference pointer that maps the thread 602a to the second thread memory space 606 such that that reference pointer maps the thread 600a to the second thread memory space 606, and changing page ownership information that provides the thread 602a ownership of the second thread memory space 606 such that the thread 600a owns the second thread memory space 606. However, while specific notation reference information modification operations have been described, one of skill in the art in possession of the present disclosure will recognize that the second thread memory space 606 may be disassociated with the thread 602a and associated with the thread 600a in a variety of manners that will fall within the scope of the present disclosure as well.

The method 500 proceeds to block 514 where the data mover subsystem modifies notational reference information to disassociate a second portion of the memory system and the second thread, and associate the second portion of the memory system with the first thread. Continuing with the example provided above, at block 514, the modification of the notational reference information in the memory fabric management database 314 may include the data mover engine 310 disassociating the thread 600a from the first thread memory space 604 that it was allocated in the memory device(s) 404 included in the memory system 206/400 at block 502, and associating the thread 602a with the first thread memory space 604 in the memory device(s) 404 included in the memory system 206/400. In a specific example, the disassociation of the thread 600a from the first thread memory space 604 and the association of the thread 602a with the first thread memory space 604 may include changing a reference pointer that maps the thread 600a to the first thread memory space 604 such that that reference pointer maps the thread 602a to the first thread memory space 604, and changing page ownership information that provides the thread 600a ownership of the first thread memory space 604 such that the thread 602a owns the first thread memory space 604. However, while specific notation reference information modification operations have been described, one of skill in the art in possession of the present disclosure will recognize that the first thread memory space 604 may be disassociated with the thread 600a and associated with the thread 602a in a variety of manners that will fall within the scope of the present disclosure as well.

Figure 9:
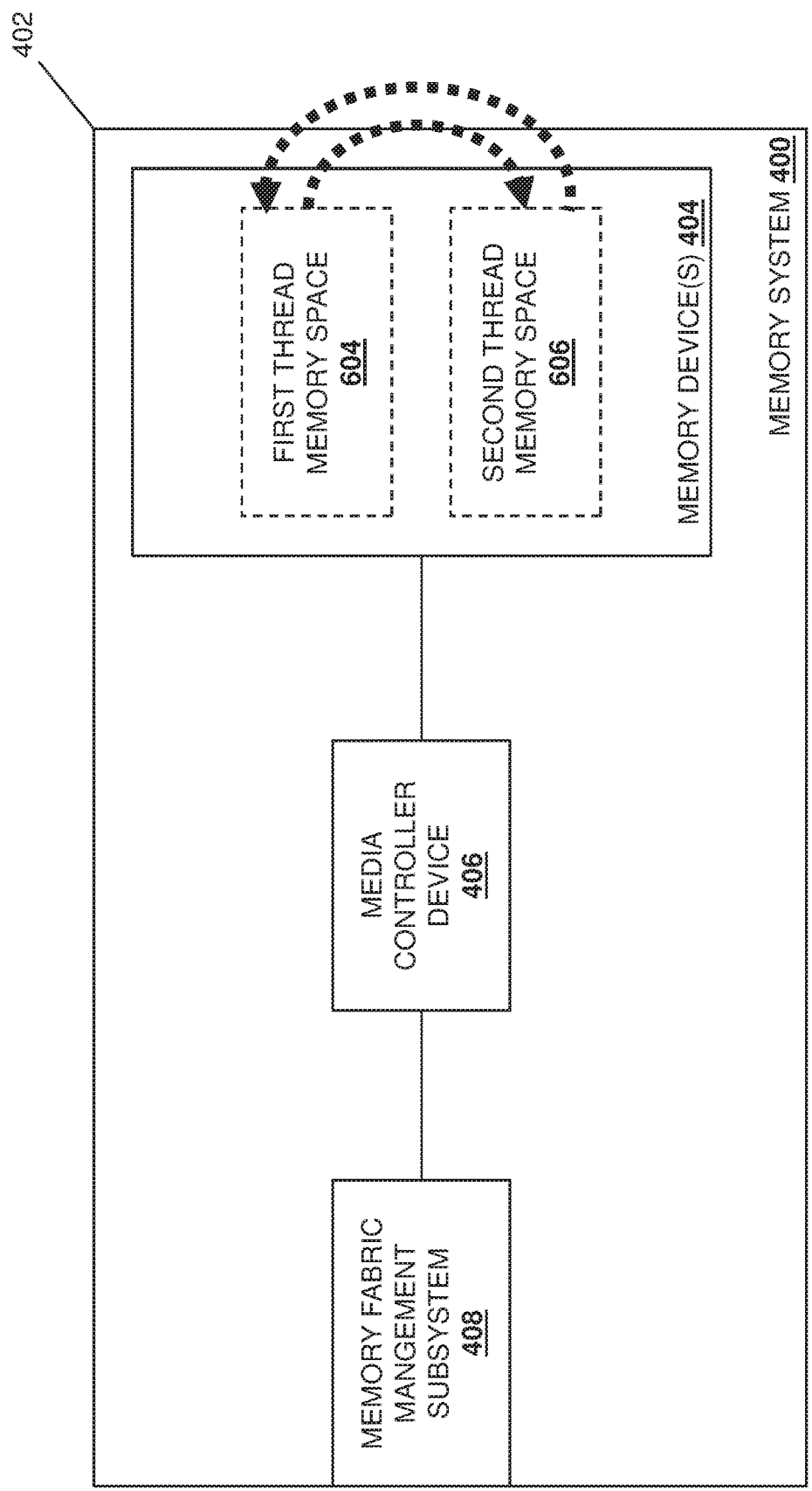
FIG. 9 is a schematic view illustrating an embodiment of the memory system of FIG. 4 operating during the method of FIG. 5.

As will be appreciated by one of skill in the art in possession of the present disclosure, the notation reference information modification performed at block 512 and 514 may be performed at substantially the same time and/or as part of similar operations such that the first thread memory space 604 and the second thread memory space 606 in the memory device(s) 404 in the memory system have their allocations (i.e., to the threads 600a and 602a, respectively) "swapped", as illustrated in FIG. 9 (which one of skill in the art in possession of the present disclosure will recognize is accomplished entirely by the modifications of the notational reference information in the memory fabric management database 314, and does not require data movement actions to be performed within the memory system 206/400.) As such, blocks 512 and 514 may provide for the swapping of reference pointers in the memory fabric management database 314 that map the thread 600a to the first thread memory space 604 and that map the thread 602a to the second thread memory space 606 such that the thread 600a is mapped to the second thread memory space 606 and the thread 602a is mapped to the first thread memory space 604, and the swapping of page ownership information that provides the thread 600a ownership of the first thread memory space 604 and that provides the thread 602a ownership of the second thread memory space 606 such that the thread 600a owns the second thread memory space 604 and the thread 602a owns the first thread memory space 604.

In many embodiments, the portions of the memory system 206/400 being swapped may be equal sized portions of the memory system 206/400 so that the first thread transferring data to the second thread does not lose allocated memory as a result of the method 500. As such, the first thread memory space 604 may be equal in size to the second thread memory space 606 so that the thread 602a does not lose allocated memory in the "transfer" of the data in the second thread memory space 606 to the thread 600a. In some embodiments, the portion of memory allocated to the second thread that is provided to the first thread that is "transferring" the data during the method 500 may be selected to have the same size as the portion of the memory allocated to the first thread that stores that data prior to "transfer" (e.g., the second thread memory space 606 in the example above). As such, the first thread memory space 604 may be identified during the method 500 for reallocation to the thread 602a based on it being currently allocated to the thread 600a and having a size that is equal to the second thread memory space 606 that stores the data being "transferred" by the thread 602a. However, while a specific example of the swapping of memory space allocations having equal sizes has been described, one of skill in the art in possession of the present disclosure will recognize that different sized memory spaces may be swapped. Furthermore, in some embodiments, block 514 may be skipped such that the first thread (e.g., the thread 602a in the examples below) ends up losing allocated memory as part of the notational reference information modification data "transfer".

Figure 10A:
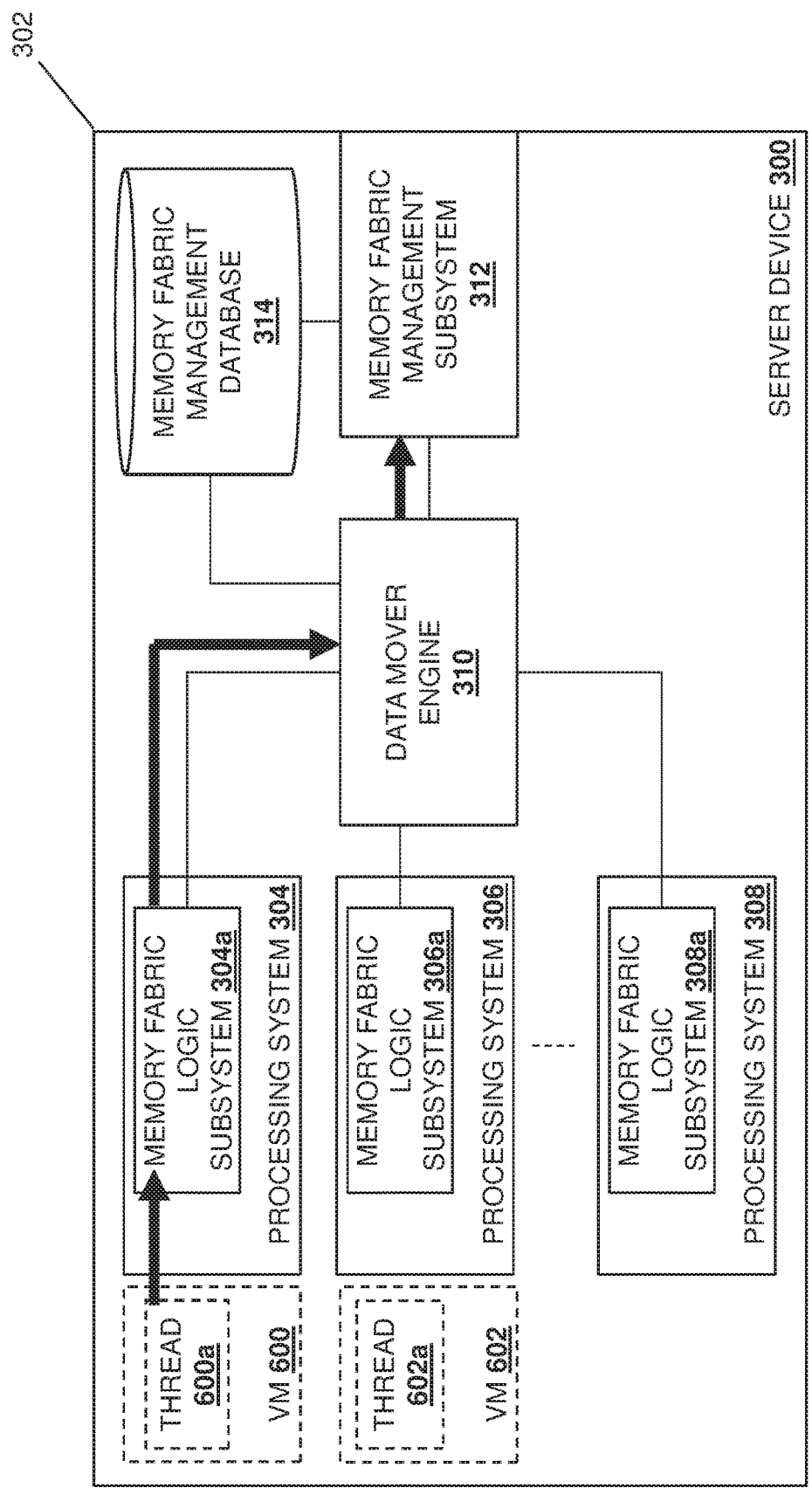
FIG. 10A is a schematic view illustrating an embodiment of the server device of FIG. 3 operating during the method of FIG. 5.
Figure 10B:
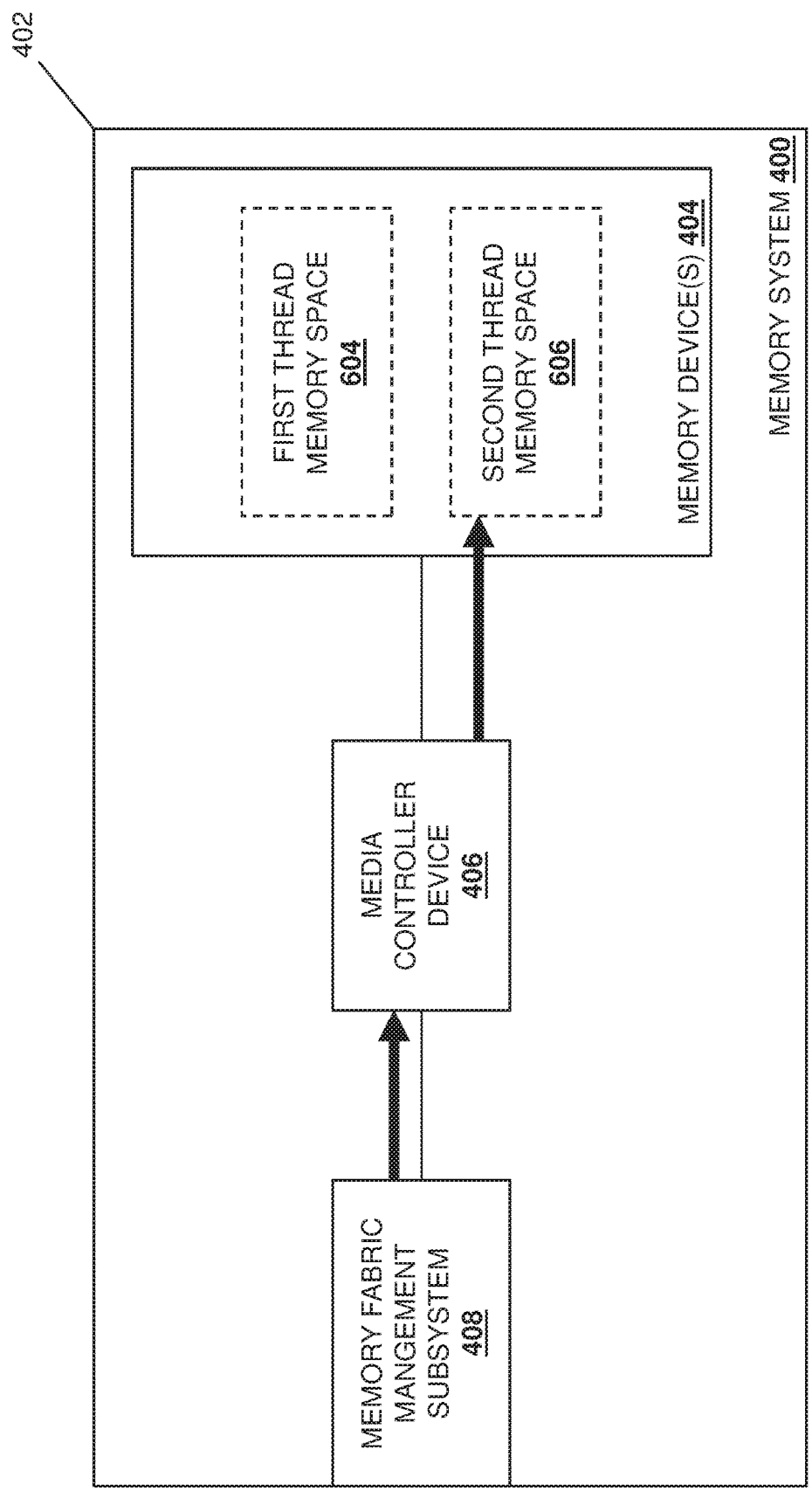
FIG. 10B is a schematic view illustrating an embodiment of the memory system of FIG. 4 operating during the method of FIG. 5.
Figure 10C:
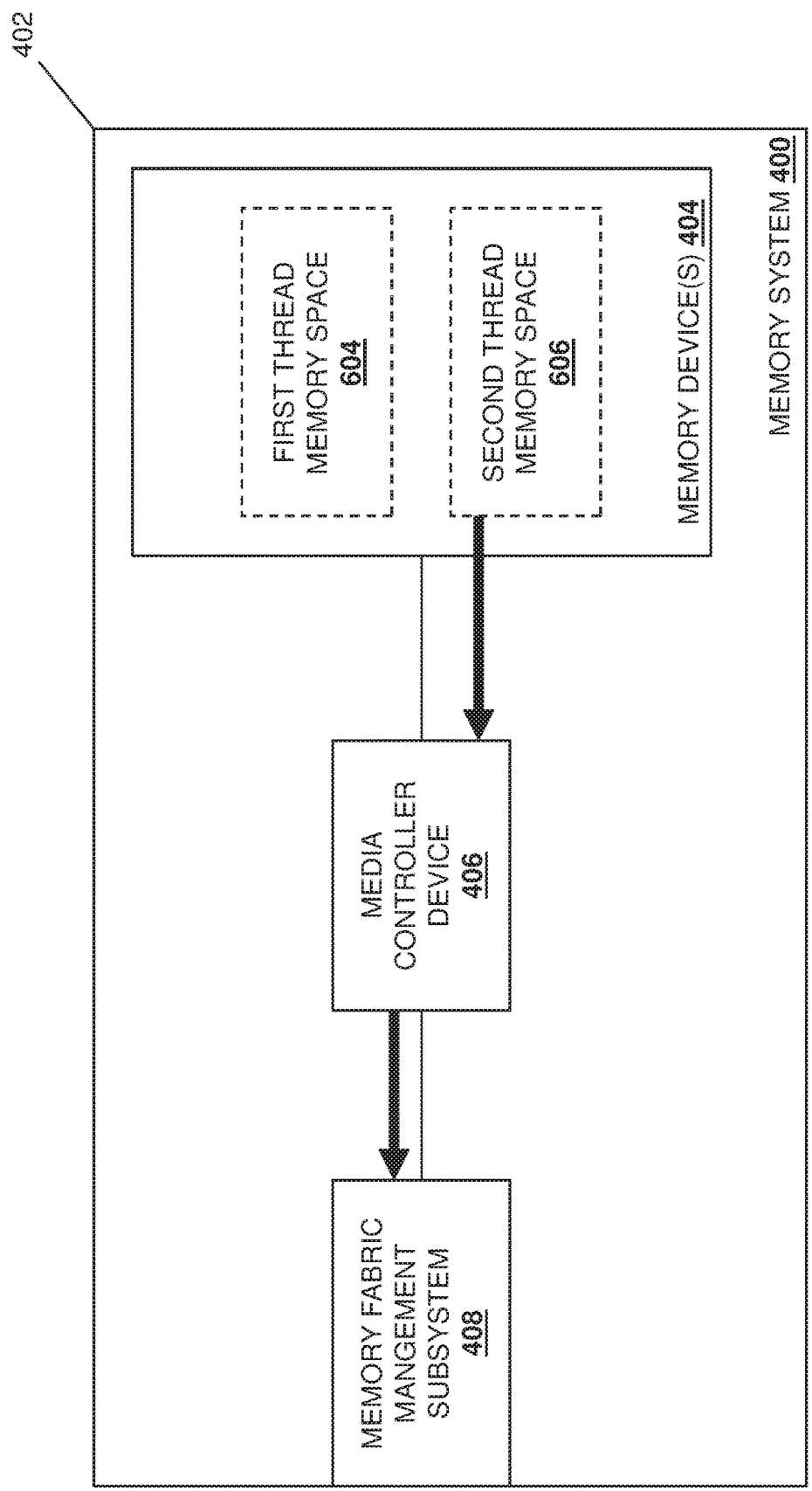
FIG. 10C is a schematic view illustrating an embodiment of the memory system of FIG. 4 operating during the method of FIG. 5.
Figure 10D:
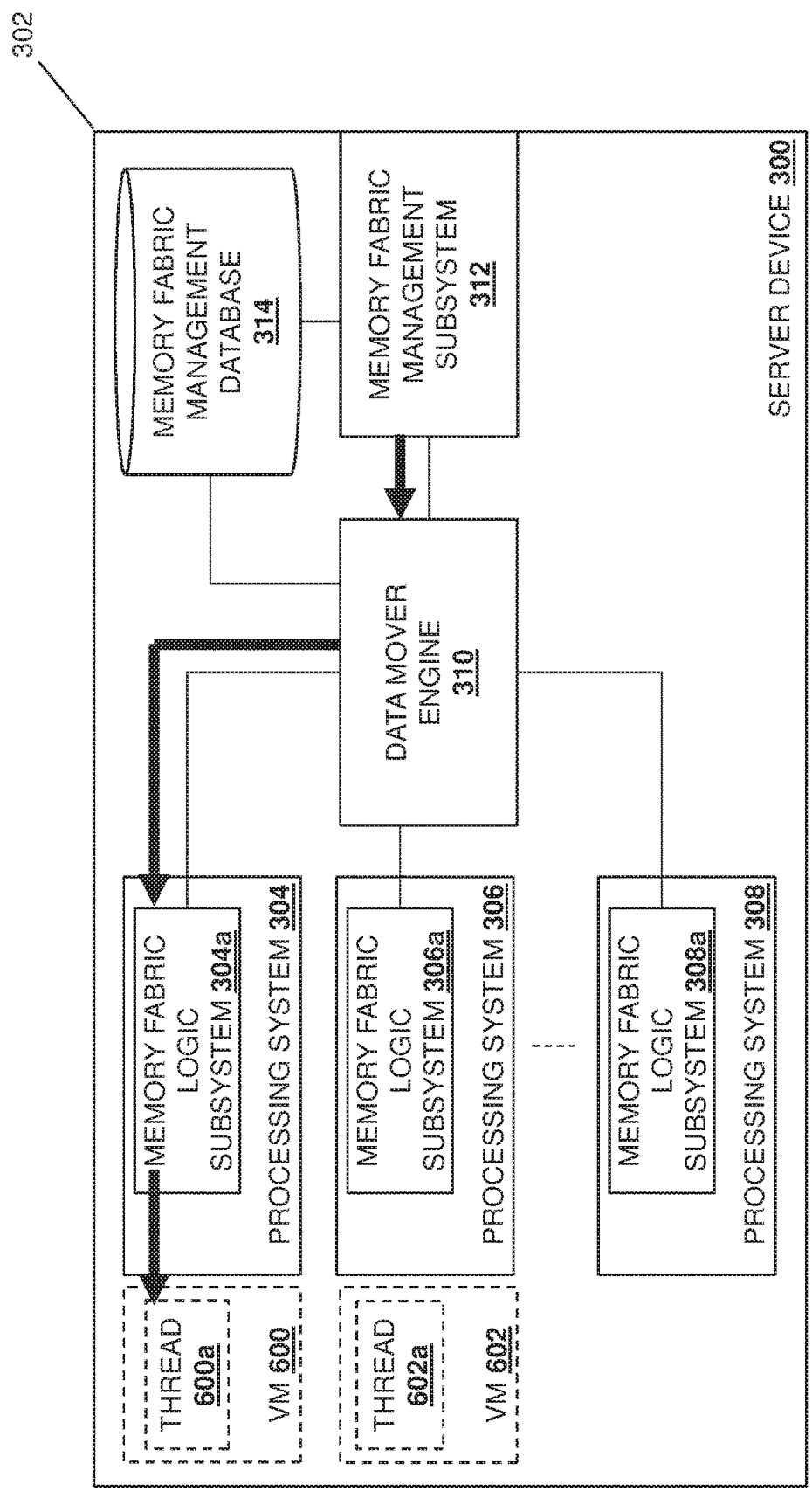
FIG. 10D is a schematic view illustrating an embodiment of the server device of FIG. 3 operating during the method of FIG. 5.

The method 500 proceeds to block 516 where the second thread accesses data in the first portion of the memory system. In an embodiment, at block 516, the thread 600a may now access the data in the second thread memory space 606 via, for example, request/respond operations. FIG. 10A illustrates the thread 600a generating and transmitting a memory load instruction via the memory fabric logic subsystem 304a in the processing system 304 and through the data mover engine 310 to the memory fabric management subsystem 312, with that memory load instruction requesting the data "transferred" by the thread 602a as discussed above. The memory fabric management subsystem 312 may then act as a memory fabric requester (e.g., a Gen-Z requester) and utilize the notation reference information in the memory fabric management database 314 to generate a memory fabric request (e.g., a Gen-Z request) that is transmitted via the network 204 to the memory system 206. As illustrated in FIGS. 10B and 10C, the memory fabric management subsystem 408 may act as a memory fabric responder (e.g., a Gen-Z responder) and retrieve the data via the media controller device 406 and from the second thread memory space 606 in the memory device(s) 404, generate a memory fabric response (e.g., a Gen-Z response) that includes the data retrieved from the second thread memory space 606 as its payload, and transmit that memory fabric response through the network 204 to the server device 300. FIG. 10D illustrates how the memory fabric management subsystem 312 may act as a memory fabric requester to load the data retrieved from the second thread memory space 606 (via the data mover engine 310 and the memory fabric logic subsystem 304a in the processing system 304) in a local memory system provided for the virtual machine 600 and accessible to the thread 600a. However, while a specific example of the accessing of data in the first portion of the memory system by the second thread has been described, one of skill in the art in possession of the present disclosure will recognize that data transferred via the notational reference information modifications described herein may be accessed in a variety of manners that will fall within the scope of the present disclosure as well.

Thus, systems and methods have been described that provide for the "transfer" of data, while avoiding the need to read, write, copy, and/or perform other conventional data transfer operations that actually move data between memory fabric address spaces, by changing the allocations of portions of a memory system in a memory fabric between a thread that requests to transfer that data and a thread to which the transfer of that data is requested. As such, a first thread included in a first virtual machine provided by a processing system in a server device may request to transfer data to a second thread included in a second virtual machine provided by a processing system in that server device, and a data mover subsystem may identify that request to transfer data. In response, the data mover subsystem may modify notational reference information in a database in order to swap a first portion of the memory fabric memory system that is allocated to the first thread and that stores the data to-be transferred with some equal sized portion of the memory fabric memory system that is allocated to the second thread, which allows the second thread to reference the data in the first portion of the memory fabric memory system using request/respond operations. As such, more efficient intra-device memory-fabric-based data transfers are provided that eliminate the need to perform conventional data transfer operations that actually move the data between memory fabric address spaces, while providing the effect of such data movement by notational reference modifications that reallocate portions of the memory fabric.

Furthermore, the present disclosure is being filed along with U.S. patent application Ser. No. 16/395,902, filed on Apr. 26, 2019, and directed to controller-based inter-device notational data movement techniques; and U.S. patent application Ser. No. 16/396,140, filed on Apr. 26, 2019, and directed to switch-based inter-device notational data movement techniques; each of which include embodiments that utilize notational data movement systems similar to those described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An intra-device notational data movement system, comprising:
   a chassis;
   at least one processing system that is included in the chassis and that includes at least one processor that is configured to:
      provide a first thread; and
      provide a second thread that operates concurrently with the first thread;
   a data mover subsystem that is included in the chassis and coupled to the at least one processing system, wherein the data mover subsystem is configured to:
      identify, in a communication transmitted by the first thread, a request to transfer data to the second thread that is operating concurrently with the first thread, wherein the data is stored in a first portion of a memory system that is associated with the first thread in a memory fabric management database;
      modify, in the memory fabric management database, notational reference information in order to disassociate the first portion of the memory system and the first thread and associate the first portion of the memory system with the second thread to satisfy the request to transfer the data to the second thread without moving the data from the first portion of the memory system, wherein the association of the first portion of the memory system with the second thread allows the second thread to reference the data stored in the first portion of the memory system using request/respond operations; and
      modify, in the memory fabric management database, the notational reference information in order to disassociate a second portion of the memory system and the second thread and associate the second portion of the memory system with the first thread,
         wherein the disassociation of the first portion of the memory system and the first thread, the association of the first portion of the memory system with the second thread, the disassociation of the second portion of the memory system and the second thread, and the association of the second portion of the memory system with the first thread includes at least one of:
            swapping reference pointers that map the first thread to the first portion of the memory system and that map the second thread to the second portion of the memory system, or
            swapping page ownership that provides the first thread ownership of the first portion of the memory system and that provides the second thread ownership of the second portion of the memory system such that the second thread owns the first portion of the memory system and the first thread owns the second portion of the memory system.

2. The system of claim 1, wherein the first portion of the memory system and the second portion of the memory system are the same size.

3. The system of claim 1, wherein the memory system is coupled to the chassis via a network.

4. An Information Handling System (IHS), comprising:
   a processing system; and
   a memory system that is coupled to the processing system and that includes instructions that, when executed by the processing system, cause the processing system to provide a data mover engine that is configured to:
      identify, in a communication transmitted by a first thread provided by at least one processing system included in a chassis, a request to transfer data to a second thread that is provided by the at least one processing system included in the chassis and that operates concurrently with the first thread, wherein the data is stored in a first portion of a memory system that is associated with the first thread in a memory fabric management database;

modify, in the memory fabric management database, notational reference information in order to disassociate the first portion of the memory system and the first thread and associate the first portion of the memory system with the second thread to satisfy the request to transfer the data to the second thread without moving the data from the first portion of the memory system, wherein the association of the first portion of the memory system with the second thread allows the second thread to reference the data stored in the first portion of the memory system using request/respond operations; and modify, in the memory fabric management database, the notational reference information in order to disassociate a second portion of the memory system and the second thread and associate the second portion of the memory system with the first thread, wherein the disassociation of the first portion of the memory system and the first thread, the association of the first portion of the memory system with the second thread, the disassociation of the second portion of the memory system and the second thread, and the association of the second portion of the memory system with the first thread includes at least one of:

swapping reference pointers that map the first thread to the first portion of the memory system and that map the second thread to the second portion of the memory system, or swapping page ownership that provides the first thread ownership of the first portion of the memory system and that provides the second thread ownership of the second portion of the memory system such that the second thread owns the first portion of the memory system and the first thread owns the second portion of the memory system.

5. The IHS of claim 4, wherein the first portion of the memory system and the second portion of the memory system are the same size.

6. The IHS of claim 4, wherein the memory system is coupled to the chassis via a network.

7. The IHS of claim 4, wherein the data mover subsystem is configured to:

determine that the request to transfer data to the second thread is a request to transfer the data from a first memory fabric location to a second memory fabric location and, in response, modify the notational reference information in the memory fabric management database.

8. A method for providing intra-device notational data movement, comprising:

identifying, by a data mover subsystem in a communication transmitted by a first thread provided by at least one processing system included in a chassis, a request to transfer data to the second thread that is provided by the at least one processing system included in a chassis and that operates concurrently with the first thread, wherein the data is stored in a first portion of a memory system that is associated with the first thread in a memory fabric management database;

modifying, by the data mover subsystem in the memory fabric management database, notational reference information in order to disassociate the first portion of the memory system and the first thread and associate the first portion of the memory system with the second thread to satisfy the request to transfer the data to the second thread without moving the data from the first portion of the memory system, wherein the association of the first portion of the memory system with the second thread allows the second thread to reference the data stored in the first portion of the memory using request/respond operations; and modifying, by the data mover subsystem in the memory fabric management database, the notational reference information in order to disassociate a second portion of the memory system and the second thread and associate the second portion of the memory system with the first thread, wherein the disassociation of the first portion of the memory system and the first thread, the association of the first portion of the memory system with the second thread, the disassociation of the second portion of the memory system and the second thread, and the association of the second portion of the memory system with the first thread includes at least one of:

swapping reference pointers that map the first thread to the first portion of the memory system and that map the second thread to the second portion of the memory system, or swapping page ownership that provides the first thread ownership of the first portion of the memory system and that provides the second thread ownership of the second portion of the memory system such that the second thread owns the first portion of the memory system and the first thread owns the second portion of the memory system.

9. The method of claim 8, wherein the first portion of the memory system and the second portion of the memory system are the same size.

10. The method of claim 8, wherein the memory system is coupled to the chassis via a network.

11. The method of claim 8, further comprising:

determining, by the data mover subsystem, that the request to transfer data to the second thread is a request to transfer the data from a first memory fabric location to a second memory fabric location and, in response, modifying the notational reference information in the memory fabric management database.

\* \* \* \* \*

UNITED STATES PATENT AND TRADEMARK OFFICE
CERTIFICATE OF CORRECTION

PATENT NO. : 11,157,191 B2
APPLICATION NO. : 16/396433
DATED : October 26, 2021
INVENTOR(S) : Iyer et al.

Page 1 of 1

It is certified that error appears in the above-identified patent and that said Letters Patent is hereby corrected as shown below:

In the Specification

Column 3, Line 25, "FIG. 100" should be changed to --FIG. 10C--.

Signed and Sealed this
Seventh Day of December, 2021

Drew Hirshfeld
*Performing the Functions and Duties of the
Under Secretary of Commerce for Intellectual Property and
Director of the United States Patent and Trademark Office*